United States Patent [19]
Halin

[11] Patent Number: 5,442,328
[45] Date of Patent: Aug. 15, 1995

[54] TRANSMISSION LINE CORRECTION SYSTEM

[75] Inventor: Pierre Halin, Montmorency, France

[73] Assignee: Thomson Broadcast, Cergy Saint Christophe, France

[21] Appl. No.: 999,374

[22] Filed: Dec. 31, 1992

[30] Foreign Application Priority Data

Dec. 31, 1991 [FR] France ................ 91 16375

[51] Int. Cl.[6] ............................................. H03H 11/12
[52] U.S. Cl. ........................................ 333/18; 348/710
[58] Field of Search .................... 333/18; 358/35; 348/710

[56] References Cited

U.S. PATENT DOCUMENTS

| | | | |
|---|---|---|---|
| 2,794,866 | 6/1957 | Dert | 330/53 |
| 3,573,667 | 4/1971 | Kao et al. | 333/18 |
| 4,151,490 | 4/1979 | Bazin | 333/16 |
| 4,250,459 | 2/1981 | Haass | 333/18 X |
| 4,258,340 | 3/1981 | Ryu | 333/18 |
| 4,984,079 | 1/1991 | Ho et al. | 333/18 X |

OTHER PUBLICATIONS

Patent Abstract of Japan vol. 4 No. 87 (E-16)(569) Jun. 21 1980 & JP-A-55 052 645 (Nippon Denki) Apr. 17, 1980.
Patent Abstract of Japan vol. 10 No. 337 (E-454)(2393) Nov. 14, 1986 & JP-A-61 140 233 (NEC) Jun. 27, 1986.

*Primary Examiner*—Paul Gensler
*Attorney, Agent, or Firm*—Oblon, Spivak, McClelland, Maier & Neustadt

[57] ABSTRACT

A correction system for transmission lines includes a structure adapted to automatically correct the attenuation of the DC component of any signal traveling on the line and a device adapted to correct the attenuation of the various frequency components of said signal, wherein the structure for correcting the attenuation of frequency components includes an automatic correction circuit.

17 Claims, 6 Drawing Sheets fo = 10 MHz

△A = 3 dB

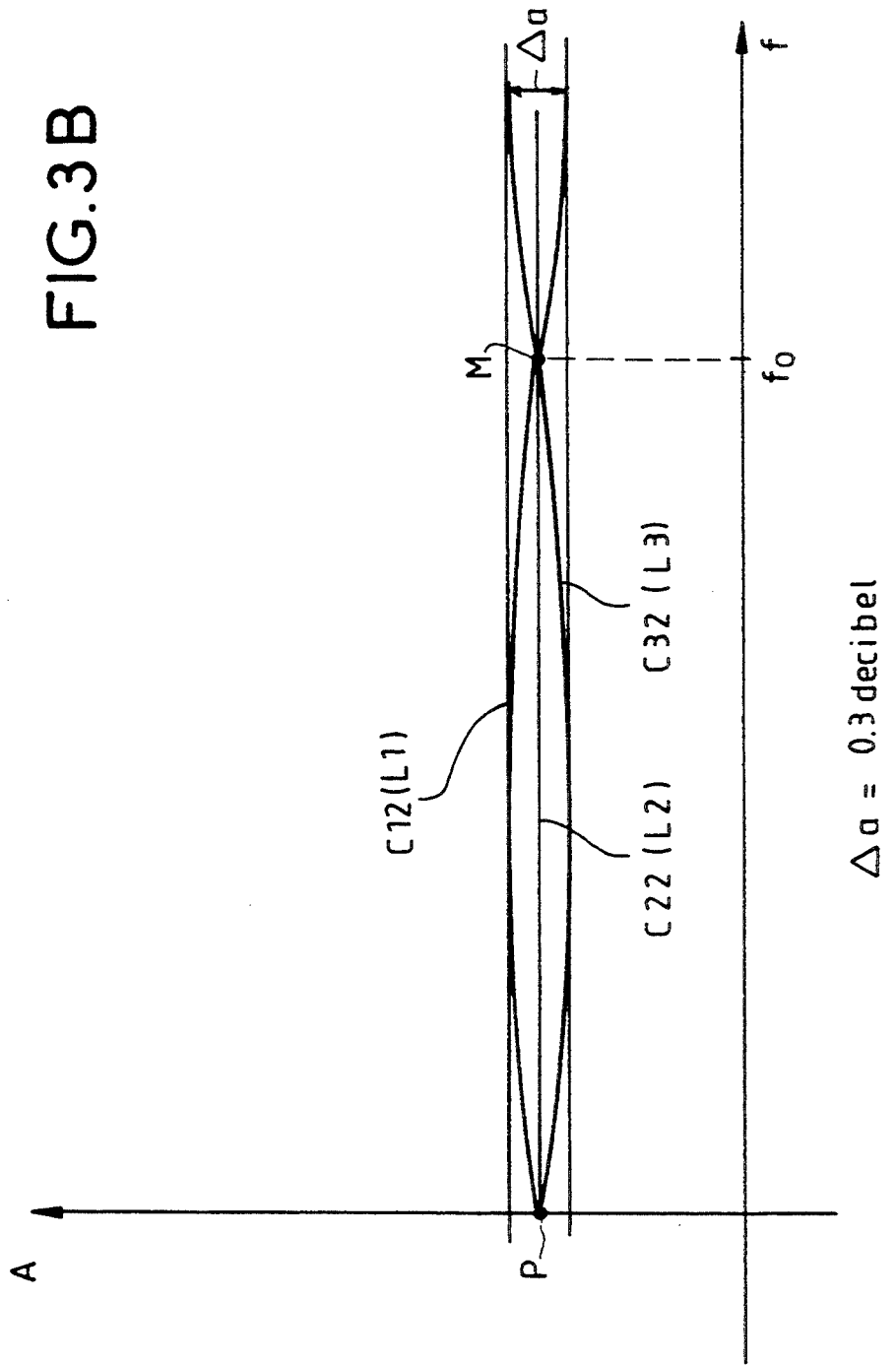

TRANSMISSION LINE CORRECTION SYSTEM

BACKGROUND OF THE INVENTION

The present invention relates to a transmission line correction device.

Transmission lines are employed generally in the telecommunications field, their purpose being to transfer an electrical signal from one point to another point. This can for example involve transmitting a video signal from a camera head to a mobile outside broadcast vehicle, or, again, between two blocks of buildings.

Every signal travelling along a transmission line becomes deformed. Thus, every transmission line causes the signal it is carrying to be attenuated, and the longer the line is, the greater the attenuation. For lines of the same type and length, for example coaxial cable constituted by the same elements, there is nevertheless a variation in attenuation from one line to an other. This is due to the fact that the elements constituting such lines are not strictly identical and nor are they associated in a strictly identical manner.

This difference in attenuation from one line to another is present both in the case of a DC signal, with zero frequency, as well as for signals of any particular frequency f. On the other hand, when the frequency f of a signal carried on a line increases, there is also an increase in signal attenuation.

Those skilled in the art know that when one considers any signal, the latter comprises a DC component and components at various frequencies. It is thus necessary, for such a signal, to simultaneously correct the DC component attenuation and the attenuation of the components at different frequences.

Various systems are known in the art which are suitable for providing such correction. In what follows, we shall use the expression "amplitude correction" to denote amplitude correction applied to a DC signal or to the DC component of any signal whatsoever. Similarly, we shall use the expression "correction for frequency" to denote the process of correcting the amplitude of a frequency signal for the components at different frequencies of any given signal.

Certain correction systems work on the basis of switching in so called correction cells. Such systems correct defects in amplitude and frequency brought about by propagation. These correction cells are built up from discrete components such as resistors, self-inductances or capacitors. Such correction systems must be located at precise points in the transmission line as they are designed to be able to correct defects in the line over a given length. The individual components constituting such cells are adjusted manually. This is disadvantageous as such adjustments are time consuming and difficult to get right. It is hence practically impossible to rapidly and cheaply adjust a system composed of several transmission lines in parallel.

Other systems use automatic correction using closed-loop feedback control, the reference value for which is derived from the actual signal. Automatic correction is only a correction of amplitude. In order to provide correction for frequency, a filter needs to be introduced into the correcting device. This filter, which is itself composed of discrete components suffers from the disadvantage of requiring manual adjustment for a given transmission line. The adjustment for one line will not be the same as that for another, even if the lines are of the same type.

SUMMARY OF THE INVENTION

The present invention does not suffer from the above disadvantages.

The present invention provides a correction system for transmission lines comprising means adapted to automatically correct the attenuation of the DC component of any signal traveling on said line and means adapted to correct the attenuation of the various frequency components of said signal, said means adapted to correct the attenuation of frequency components comprising automatic correction means.

The present invention also provides system for correcting a plurality of transmission lines comprising means for correcting the spread in attenuation of the DC components and the frequency components of the various signals traveling on said plurality of lines wherein said attenuation spread correcting means comprise automatic DC component and frequency component correction means.

One advantage of the invention is hence that of being able to provide automatic correction, both as regards amplitude and for frequency, of variations in attenuation that the signal is subject to in the lines.

BRIEF DESCRIPTION OF THE DRAWINGS

Other features and advantages off the invention will become more clear from the description that follows of a preferred embodiment with reference to the attached drawings in which:

FIG. 3B shows the attenuation curves A for three transmission lines of the same type and the same length as a function of the frequence f of the signal, in the case where the lines are corrected by means of a line correction system described in FIG. 3A.

DETAILED DESCRIPTION OF PREFERRED EMBODIMENTS

Figure 1:
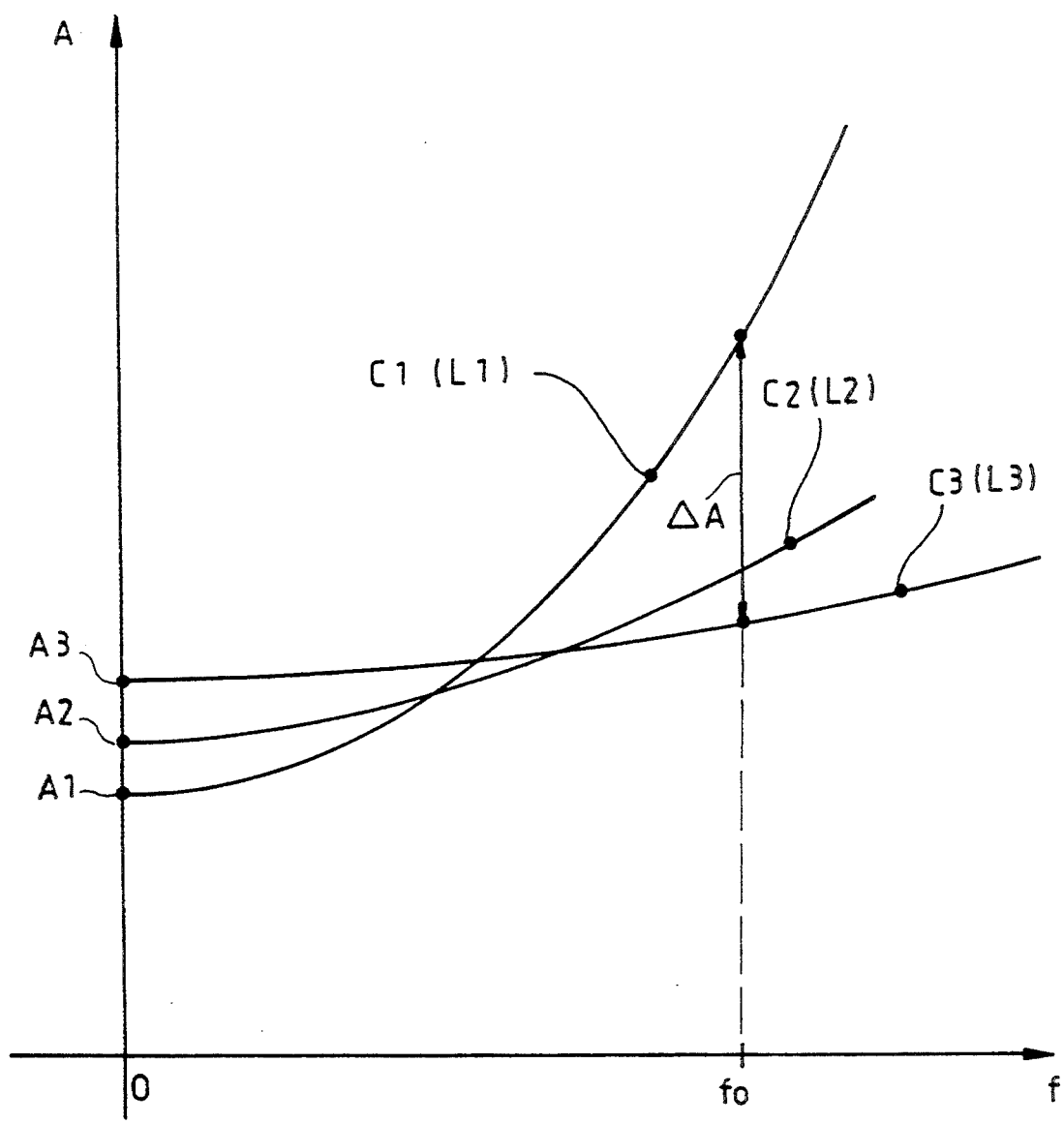
FIG. 1 shows attenuation curves A for three transmission lines of the same type and the same length as a function of the frequency f of the transmitted signal, in the absence of any correction.

FIG. 1 shows attenuation curves A for three transmission lines of the same type and the same length as a function of the frequency f of the transmitted signal, in the absence of any correction. Curve C1 (L1) relates to a line L1, curve C2 (L2) relates to a line L2 and curve C3 (L3) to a line L3. As has been said already, the attenuation A differs from one line to another. For a DC signal, in other words with zero frequency, lines L1, L2 and L3 introduce attenuations of respectively A1, A2 and A3. Similarly, with increase of frequency, attenuation evolves differently from one line to the other. One can thus for example find a differential attenuation $\Delta A$ of some 3 decibels between two transmission lines of the same type (L1 and L3), each having 100 meters long and carrying an identical signal of frequency $f_o = 10$ MHZ.

Figure 2A:
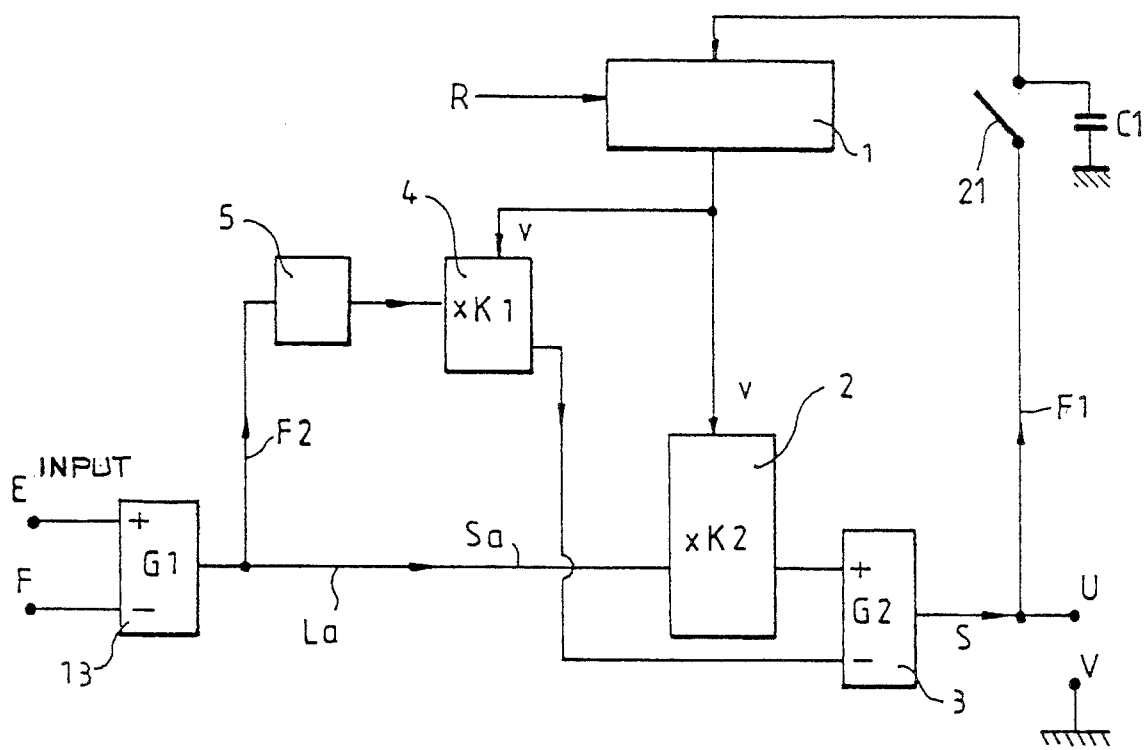
FIG. 2A is a block diagram of an automatic line correcting system in accordance with the prior art.

FIG. 2A is a block diagram of an automatic line correction system in accordances with the prior art. The points E and F are the input of the system and the points U and V are the output. A fraction F1 of the signal S is taken off at the output from the correction system, signal F1 being for example extracted by a switch 21. When switch 21 is closed, the detected voltage, for example across the terminals of capacitor C1, is a measure of the DC component of the signal. The detected voltage is then fed to a comparator 1 which compares it with a reference value R in order to generate a gain correction value v. The gain correction value v is used to control a multiplier 2 the multiplication factor K2 of which, applied to the signal Sa traveling along the line portion La, makes it possible to adjust the amplitude of output signal S to the correct value via the differential amplifier 3. To achieve this, the signal from multiplier 2 is fed to the positive terminal of the differential amplifier 3 having linear gain G2. To achieve correction for frequency, a fractional part F2 of signal Sa is taken off from line portion La and this part of signal F2 is fed to a high-pass filter 5 which is set to provide correction for frequency of the line's attenuation curve, in accordance with the desired law. This law can be such, for example, that the slope of the attenuation curve for signal S as a function of frequency is zero.

The gain correction value v is applied to a multiplier of multiplication factor K1. The signal from multiplier 4 is then fed to the negative terminal of differential amplifier 3, thus providing correct frequency response adjustment of the transmission line. The frequency correcting filters 5 consist of self-inductances and capacitors.

For certain applications, the upper cutoff frequency of the transmission line can reach high values, for example 500 MHz. Those skilled in the art know that it is then necessary to employ a large number of self-inductances and capacitors in order to cover a frequency response extending over such a wide band. As the self-inductances and capacitors require manual adjustment, correction for frequency of the line is, under such conditions, a time consuming operation which is difficult to perform correctly.

Apart from this, temperature stability and time stability of such filters are in fact poor because they are constructed using discrete components.

Figure 2B:
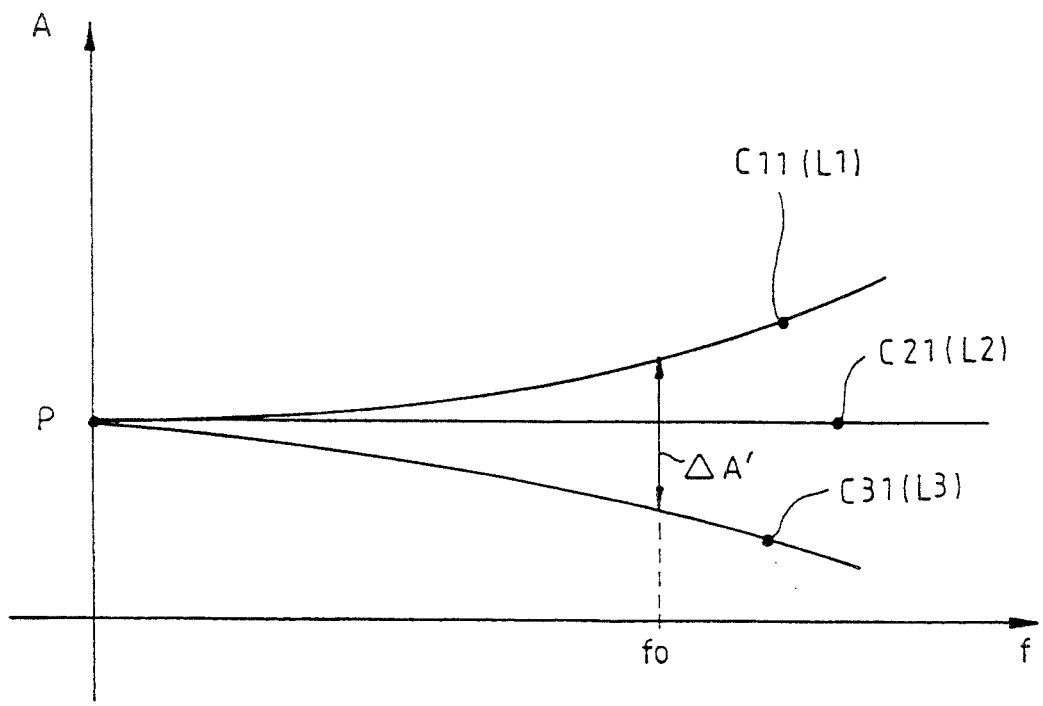
FIG. 2B shows the attenuation curves A for three transmission lines of the same type and the same length as a function of the frequence f of the signal, in the case where the lines are corrected by means of a line correction system described in FIG. 2A.

FIG. 2B shows the attenuation curves A for three transmission lines of the same type and the same length as a function of the frequence f of the signal, in the case where the lines are corrected by means of a line correction system described in FIG. 2A. At zero frequency, all the curves (C11 (L1), C21 (L2), C31 (L3)) pass through the same point P. This is due to the fact: that amplitude correction is carried out using closed loop feedback control employing amplitude values obtained from the actual signal, as described above. Curve C21 (L2) represents the attenuation of a line L2. On this line, filter 5 allowing correction for frequency has been adjusted to provide zero slope of attenuation as a function of frequency. Adjustment is manual, and thus tricky to perform.

Curves C11 (L1) and C31 (L3) show the respective attenuations for two transmission lines L1 and L3 of the same type and length as line L2, in the case where the filter 5 providing correction for frequency is the one that was adjusted to correct line L2. It will be seen that the curves spread with frequency. At frequency $f_o = 10$ MHz, there is a differential attenuation of some 3 decibels between the lines L1 and L3. In order to obtain curves C11 (L1) and C31 (L3) of zero slope as a function of frequency, it would be necessary to specifically adjust the frequency correction filter 5 of each line. Thus, it is necessary to separately correct each transmission line when it is desired to implement a device employing several lines in parallel. As has been mentioned above, such adjustments are done manually, leading to lengthy manipulations which rapidly become very costly.

Figure 3A:
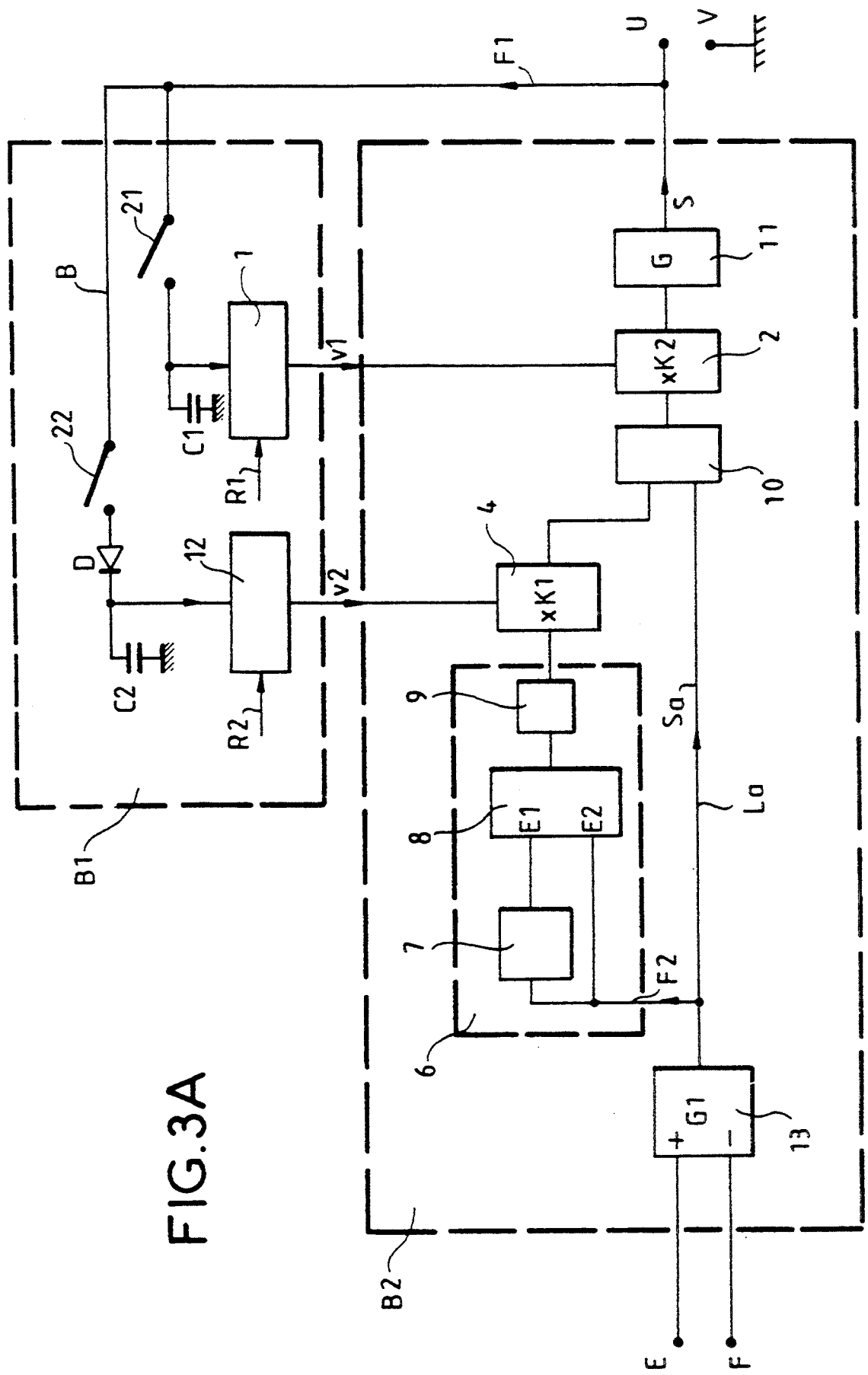
FIG. 3A is a block diagram of a line correction system according to the preferred embodiment of the invention.

FIG. 3A shows a block diagram of a line correcting system according to the preferred embodiment of the invention.

The points E and F constitute the input to the system, and the points U and V the output. Similarly to the system described in FIG. 2A, it will be seen that an amplitude correction loop is provided using, as reference value R1, a signal portion of a calibrated level. This portion can for example be the bottom of the video synchronizing signal making it possible to provide, at low frequencies, correction of signal attenuation due to the transmission line's ohmic resistance. Using comparator 1, a small portion of signal F1 taken off from the correction system's output when switch 21 closes is compared with reference value R1 in order to generate a gain correction value v1.

At the desired frequency, or reference frequency, correction for frequency is carried out in accordance with the invention using amplitude feedback loop B. A fraction F1 is taken off from signal S using switch 22 for example. When switch 22 is closed, diode D provides signal peak detection at the desired frequency. The voltage obtained across capacitor C2 is then fed to a comparator 12 in order to establish a correction-for-frequency value v2 by comparing the said voltage obtained with a frequency reference R2. Correction value v2 is then used to control a multiplier 4 the multiplication factor K1 of which, when applied to the signal from filter 6, enables the amplitude of the signal to be adjusted to the correct level at the reference frequency.

Those skilled in the art will understand that it is possible to use any detection means apart from diode D and capacitor C2 as well as any other comparison means other than comparator 12.

In accordance with the preferred embodiment of the invention, automatic correction for frequency is carried out at a given reference frequency. Nevertheless, in accordance with the invention, it is also possible to provide automatic correction for a frequency at several reference frequencies.

In this case, an amplitude control loop will be provided for each reference frequency. The signal enabling a reference frequency to be obtained can either be contained in the useful information which the signal being carried represents, or have been specially created for the purpose of acting as a reference signal. In accordance with the preferred embodiment of the invention, the reference frequency is, for the case of a video signal, the frequency of the video chrominance subcarrier reference signal, usually referred to as a burst.

Filtering device 6 makes it possible to provide, in accordance with the desired law, correction for frequency on other frequency components, other than the component at the reference frequency. The response curve of filter 6 is suitably chosen so that the line's attenuation curve as a function of frequency can be Corrected in accordance with the desired law. Filter 6 can, for example, be a high-pass filter which is designed so that the attenuation curve for signal S as a function of frequency has zero slope.

Filter 6 comprises a delay line 7, a summing circuit 8 and a phase shifter 9. In order to adjust the signal to the desired frequency law, a fraction F2 of signal Sa is taken off from line portion La. This fraction of signal F2 is fed, firstly, to delay line 7 and, secondly, to the input E2 of summing circuit 8 the other input of which, E1, is fed with the signal from delay line 7. The output signal from summing circuit 8 is fed to a phase shifter 9 which carries out phase correction, in order, for example, to bring the signals arriving at summing circuit 10 into phase.

In accordance with the preferred embodiment of the invention, phase shifter 9 is provided at the output from summing circuit 8. It could equally well be inserted at the output from multiplier 4.

Value v2 for applying correction for frequency is then used to control a multiplier 4 the multiplication factor K1 of which provides amplification of the signal from filter 6 providing correction for frequency.

The signal from multiplier 4 is fed to a summing circuit 10 the second input of which is fed with the signal directly output by differential amplifier 13 of gain G1 fitted at the input of the device. Correction value v1 is used to control a multiplier 2 the multiplication factor K2 of which, when applied to the signal output by summing circuit 10, enables the amplitude of output signal S to be varied. The signal from multiplier 2 is fed to an amplifier 11 of gain G.

One advantage of the invention resides in the use of a filter 6 of the delay line type, commonly called a "comb filter". This type of filter offers the advantage of not requiring any adjustment as its response is defined by the value of the delay line. It has high stability with the passage of time as it is not built up from discrete components. This latter characteristic also ensures that filter 6 can be reproduced excellently. Using such a filter advantageously contributes to reducing the cost of implementing the line correction system according to the invention.

In FIG. 3A, comparators 1 and 12, switches 21 and 22, and detection components C1, D and C2 are grouped together in the same correction value determination subassembly B1. Similarly, amplifiers 13 and 11, summing circuits 8 and 10, multipliers 2 and 4, and filter 6 are grouped together in the same correction block or subassembly B2.

FIG. 3B shows the attenuation curves L1, L2 and L3 for three transmission lines of the same type and length as a function of the frequency f of the signal transmitted, in the case where the lines are corrected by means of the system according to the invention described in FIG. 3A.

At zero frequency, the amplitude correction loop ensures the three curves meet at point P. At the reference frequency $f_o$, the correction loop for frequency ensures that, according to the invention, the curves intersect at point M. Curve C22 (L2) represents the amplitude response as a function of frequency of the line L2, when the characteristics of filter 7 have been calculated in order to exactly cancel out the slope of the attenuation which existed before correction.

Curves C12 (L1) and C32 (L3) respectively show the response of line L1 and the response of line L3 when the same correction device as the one calculated for use with line L2 is used. For a passband identical to the passband of the system previously described (FIG. 2A), the spread of amplitude between lines is then comprised within a range $\Delta$ a=0.3 decibel. This value for $\Delta$ a should be compared with the value $\Delta$ A'=3 decibels given above.

One can see the advantage of using a device according to the invention for keeping the spread of amplitude with frequency within acceptable limits.

Figure 3C:
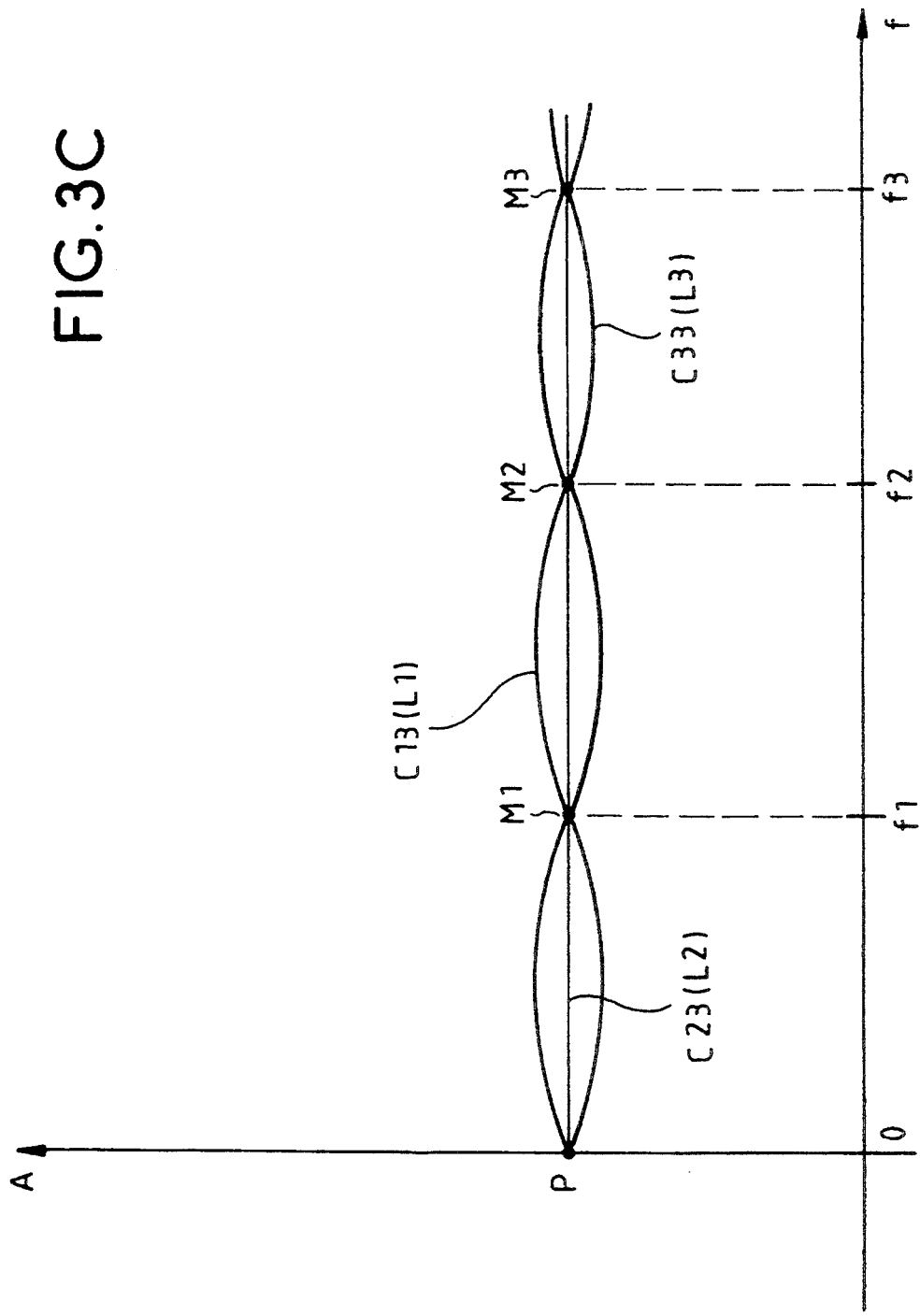
FIG. 3C shows the attenuation curves A for three transmission lines of the same type and the same length as a function of the frequence f of the signal, in accordance with another embodiment of the invention.

FIG. 3C shows, as a function of the frequency f of the signal transmitted, attenuation curves A for three transmission lines of the same type and length in accordance with another embodiment of the invention.

As has been mentioned above, it is possible to multiply the frequency reference points in order to improve the device's response. FIG. 3C shows the amplitude response of three transmission lines L1, L2 and L3 in the case where, for example, three reference frequencies are considered. The curves thus meet at three points: M1 at frequency f1, M2 at frequency f2 and M3 at frequency f3.

The correction system according to the invention additionally makes it possible to provide a significant reduction in the spread between different lines and, secondly, to simplify adjustment by using analog delay line filters. It thus becomes possible to provide correction systems for several transmission lines in parallel. This can for example involve correcting the various transmission lines of a single multi-conductor cable.

Figure 4:
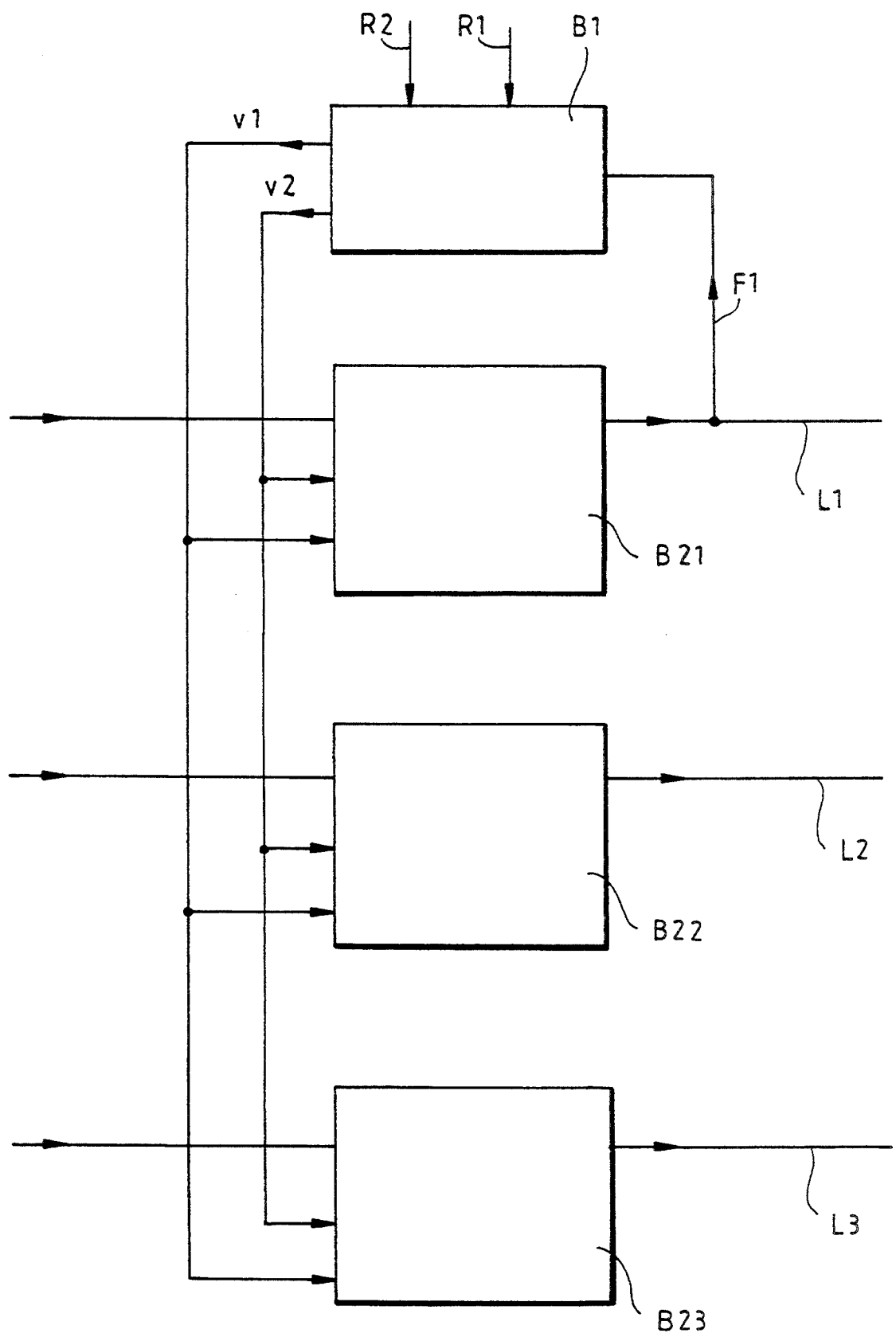
FIG. 4 shows one application of the correction system according to the invention.

FIG. 4 shows one application of the correction system according to the invention in the case where, for example three transmission lines are put in parallel. Correction determination block or subassembly B1 is common to the three lines. It is supplied with respective amplitude and frequency reference values R1 and R2, the signal detection components (C1,D, C2) and the comparison components (1, 12) being incorporated into the subassembly. Each transmission line is fitted with a correction subassembly: subassembly B21 for line L1, B22 for line L2 and B23 for line L3. Each correction subassembly incorporates components for applying correction for frequency (7, 8, 9, 4, 10) together with devices for amplifying the signal (13, 2, 11).

Devices that employ several transmission lines in parallel are often necessary. This can particularly be the case when it is necessary to provide several links between two point A and B, in both the directions A to B and B to A. The ease with which such systems can be set up is an advantage of the invention.

What is claimed is:

1. A correction system for adjusting the amplitude of signals on at least one transmission line, comprising:
   means for automatically correcting the attenuation of a DC component of a signal traveling on each of said at least one line; and
   means for adjusting the attenuation of a plurality of frequency components of said signal, said means for adjusting the attenuation of frequency components comprising automatic correction means, wherein said automatic correction means includes a means for individually adjusting the amplitude of each of said plurality of frequency components of said signal to a desired amplitude value which means for individually adjusting the amplitude comprises a closed feedback loop.

2. A transmission line correction system according to claim 1, wherein said frequency component amplitude correction closed feedback loop comprises means adapted to extract a fraction of the signal at a desired frequency value, means for measuring the amplitude of said fraction of said signal, means for comparing said measured amplitude with a reference value in order to generate a correction signal for said frequency, and means for adjusting the signal amplitude of said frequency component to a desired level.

3. A transmission line correction system according to claim 2, wherein said means for extracting a fraction of the signal at the desired frequency value comprises a switch, the means for measuring the amplitude of said signal fraction comprises a diode connected to a capacitor, said means for comparing the measured amplitude with a reference value comprises a comparator, and said means for adjusting the amplitude of the frequency component to a desired level comprises a multiplier.

4. Transmission line correction system according to claim 1, wherein said means for adjusting the attenuation of frequency components includes at least one filtering device.

5. A transmission line correction system according to claim 4, wherein said filtering device comprises at least one delay line.

6. A transmission line correction system according to claim 4, wherein said filtering device includes at least one phase shift circuit.

7. A transmission line correction system according to claim 5, wherein said filtering device includes at least one phase shift circuit.

8. A correction system for adjusting the amplitude of signals on a plurality of transmission lines, comprising:
means for correcting a spread in attenuation of DC components and frequency components of signals traveling on said plurality of lines wherein said attenuation spread correcting means includes automatic DC component and frequency component correcting means, wherein said automatic DC component and frequency component correcting means includes a first means for providing a common gain correction signal and at least one frequency-related correction signal, and a plurality of second means respectively corresponding to said plurality of transmission lines, for modifying an amplitude of said signals traveling over said plurality of transmission lines.

9. A correction system for a plurality of transmission lines according to claim 8, wherein said first means for supplying a common gain correction signal and at least one frequency-related correction signal comprise, firstly, means for extracting a fraction of the DC component of the signal traveling on one of said plurality of lines, means for measuring the amplitude of said DC component and means for comparing said measured amplitude with a reference amplitude in order to generate a gain correction signal and, secondly, for each one of said frequency-related correction signals, means for extracting a fraction of a frequency component of said signal, means for measuring the amplitude of said extracted frequency component, means for comparing the thus measured amplitude with a reference value selected for said frequency in order to generate said frequency-related correction signal.

10. A correction system for a plurality of transmission lines according to claim 8, wherein each one of said plurality of second means is connected in series on one of said plurality of transmission lines.

11. A correction system for a plurality of transmission lines according to claim 10, wherein each one of said plurality of second means includes means for adjusting the amplitude of the DC component of said signal to a desired value using the value of said gain correction signal, and means for adjusting the amplitude of at least one frequency component using the value of said frequency-related correction signal.

12. A correction system for a plurality of transmission lines according to claim 10 wherein each one of said plurality of second means includes at least one filter employing a delay line.

13. A correction system for plurality of transmission lines according to claim 11 wherein each one of said plurality of second means includes at least one filter employing a delay line.

14. A correction system for a plurality of transmission lines according to claim 9, wherein each one of said plurality of second means is connected in series on one of said plurality of transmission lines.

15. A correction system for a plurality of transmission lines according to claim 14, wherein each one of said plurality of second means includes means for adjusting the amplitude of the DC component of said signal to a desired value using the value of said gain correction signal, and means for adjusting the amplitude of at least one frequency component using the value of said frequency-related correction signal.

16. A correction system for a plurality of transmission lines according to claim 14 wherein each one of said plurality of second means includes at least one filter employing a delay line.

17. A correction system for a plurality of transmission lines according to claim 15 wherein each one of said plurality of second means includes at least one filter employing a delay line.

* * * * *